Feb. 9, 1943. G. M. RICHARD 2,310,493
WEIGHING SCALE
Filed July 24, 1940
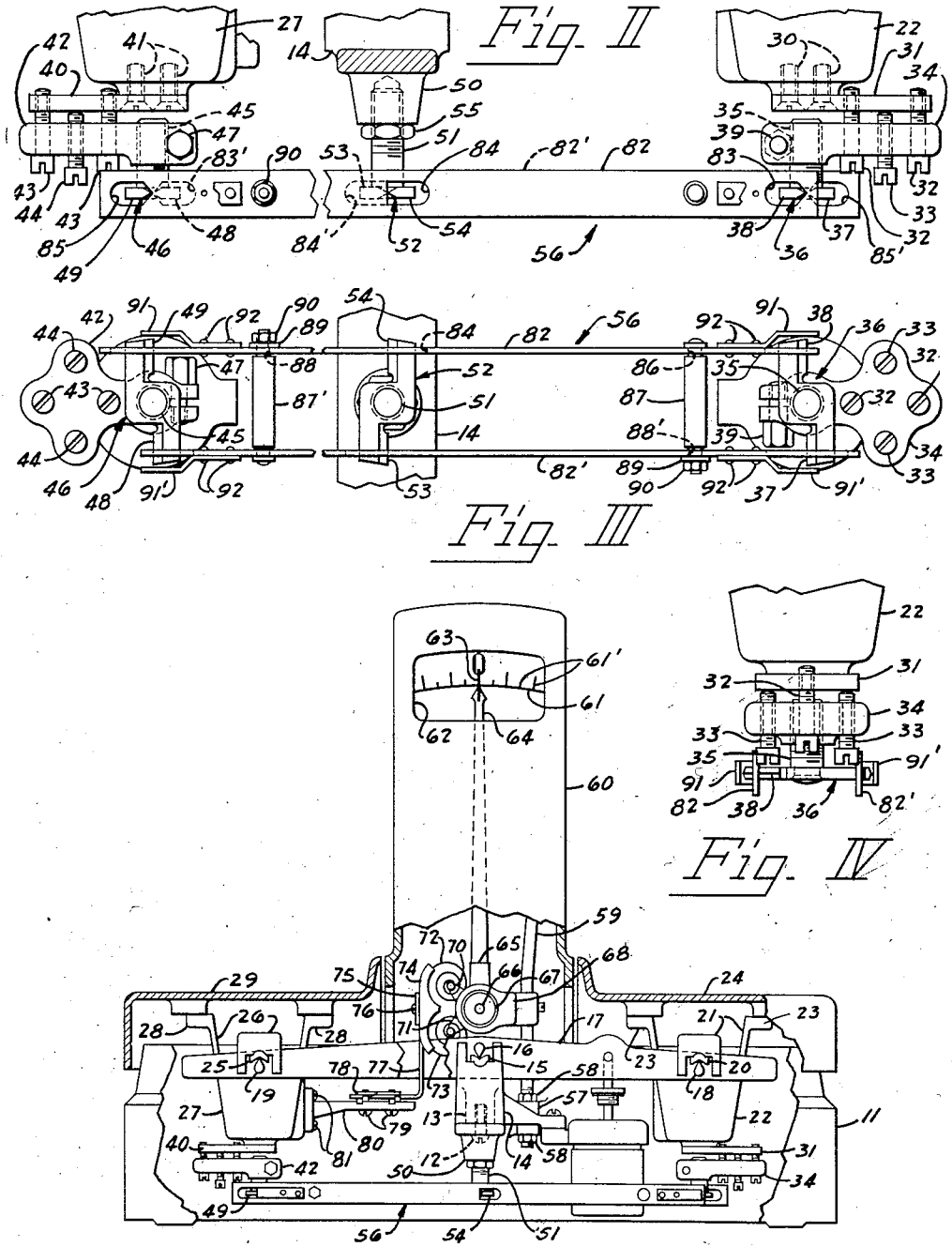
Grant M. Richard
INVENTOR
BY Marshall & Marshall
ATTORNEYS Patented Feb. 9, 1943

2,310,493

UNITED STATES PATENT OFFICE 2,310,493

WEIGHING SCALE

Grant M. Richard, Toledo, Ohio, assignor to Toledo Scale Company, Toledo, Ohio, a corporation of New Jersey Application July 24, 1940, Serial No. 347,177

5 Claims. (Cl. 265—54)

This invention relates generally to weighing scales, and more particularly to scales of the even-balance type. Scales of this type are equipped with a centrally fulcrumed two-armed lever having load and counterpoise receivers pivotally mounted upon the opposite ends of the lever. The load receiver must be "checked" so that they may maintain their condition of level. Such check arrangements usually comprise a link having bearings spaced to correspond exactly to the spacings of the fulcrum and load pivot in the scale lever thus forming a parallelogram.

In general, two different types of check links are employed in weighing scales. The first of these is the so-called "pin" check link in which the links are single horizontally extending strips of metal which are pivoted between the bifurcations of arms extending from the frame, or the load receivers, by means of a pin extending through the bifurcations and through a hole in the end of the link. This type of check link has a serious disadvantage, arising from the friction created on the pin pivot, which prevents its employment in highly accurate weighing scales.

The second type of check link frequently used consists of two substantially parallel plates which have apertures therein with surfaces forming bearings for knife edge pivots which extend through the apertures.

In single arm scales, the pin type check link must serve to overcome both tension and compression which, of course, as mentioned above, creates friction and wear. Using the two-plate articulated check link in a single arm scale overcomes this difficulty since one plate forms the tension member and the other the compression member.

In scales of the even balance type however, the main lever is fulcrumed at its center and has two substantially even length arms extending in opposite directions, each arm having a load receiver supported near its extremity. It is therefore, necessary to provide a checking means for each of the load receivers. If the pin type check link were used, the problem would not be difficult since the inner ends of the oppositely extending links could be pivoted side by side on the same pin. However, because of the frictional errors arising from the use of such pin type check links, it has been the practice to use a separate two-part articulated link for each of the load receivers. Since the inner ends of these check links must be pivoted on a point directly below the fulcrum pivot of the main lever in order to establish the stabilizing parallelogram, and must be pivoted upon coincident axes for balance in the weight supported by each load receiver, these links must be assembled in side-by-side relation. This is not desirable because the check link pivots, secured to the load receivers, cannot be located in a plane passing vertically through the longitudinal axis of the main lever and thus an off-center thrust is exerted upon the check link when a load is placed upon the load receiver. Furthermore, since one of the two plates of each check link is a compression plate and the other a tension plate, and the pivots engaging these plates must be turned in opposite directions, the plates must be manufactured to different specifications.

Other even-armed scales have employed single checking links extending the full length of the main lever and having bearing points on a fixed plate located beneath the main lever fulcrum point and also on plates depending from the two load receivers. This type of construction introduces the necessity for very careful machining of the links and does not do away with the objection outlined above, which is that the two plates making up the check link must be differently constructed. This means that not only is the manufacturing process different for the two sections of the link but they must also be handled and stocked separately and, in case of emergency repair, one can never be substituted for the other.

The principal object of this invention is the provision of an accurate check link mechanism which is relatively inexpensive to manufacture.

A further object is the provision of a check link assembled from two identical longitudinally extending bearing plates in which the bearing plates are assembled to each other in reversed relation.

A further object is the provision of improved means for assembling a check link so that two longitudinally extending plates may readily align themselves to pivots which they engage; and, Still another object is the provision of improved simple means for limiting lateral sliding motion of the link.

These, and other objects and advantages will be apparent from the following description in which reference is had to the accompanying drawing, illustrating a preferred embodiment of the invention and wherein similar reference numerals refer to similar parts throughout the several views.

In the drawing:

Fig. I is a front elevational view of a scale embodying the invention, portions of the casing members being broken away.

Fig. II is an enlarged fragmentary elevation showing the check link and its adjusting means in detail.

Fig. III is a bottom view thereof.

Fig. IV is a fragmentary end elevation thereof.

Referring to the drawing in detail:

The base or principal frame of the scale is a rectangular shell 11 having an inwardly inclined upper edge. Secured, by means of screws 12, to bosses 13 formed in the interior of the shell 11 is a bracket 14 provided with sockets in which are mounted fulcrum bearings 15.

Supported for rocking movement on the fulcrum bearings 15 are knife edge fulcrum pivots 16 which are fixedly secured to an even-armed lever 17. Also fixedly secured to the even-armed lever 17 are a pair of commodity supporting pivots 18 and a pair of counterpoise supporting pivots 19. Engaging the commodity supporting pivots 18 are commodity platter spider bearings 20 which are mounted in inverted sockets in a commodity platter spider 21. This commodity platter spider 21 is formed with a loading box 22 and with arms 23 to which is secured a commodity platter 24. Engaging the counterpoise supporting pivots 19 are counterpoise platter spider bearings 25 which are mounted in inverted sockets in a counterpoise platter spider 26. The counterpoise platter spider is also formed with a loading box 27 and arms 28 to which is secured a counterpoise platter 29. The commodity platter and counterpoise platter have skirts which overhang the upper inwardly inclined edge of the shell 11 to prevent ingress of dirt.

Fastened to a machined boss on the bottom of the loading box 22, by means of screws 30, is a plate 31 to which is adjustably retained, by means of screws 32 and 33, a block 34 to which is threaded a short post 35 having riveted to its lower end a pivot plate 36. This pivot plate is provided with two machined knife edges 37 and 38. These edges are in coincidence but face in opposite directions. A screw 39, passing through split ears, is provided to securely clamp the post 35 into position.

The screws 32 pass freely through suitable holes in the block 34 and are threaded into the plate 31 while the screws 33 are threaded through the block and abut against the plate 31. As can be seen from Fig. III these screws are so positioned in the block that by loosening some and tightening others the knife edges 37 and 38 can be universally rocked and very accurately positioned. The loading box 27, which is an integral part of the counterpoise platter spider 26, is provided with similar pivot adjusting means.

A plate 40, similar to the plate 31, is secured to a boss on the bottom of the loading box 27 by means of screws 41 and a block 42 is adjustably mounted on the plate 40 by means of screws 43 and 44. A short threaded post 45, carrying pivot plate 46, is clamped in the block 42 by means of a small hex head bolt 47. This pivot plate is also provided with oppositely extending knife edges 48 and 49 and it will be seen from Fig. III that the knife edge 49 faces in the same direction as the knife edge 38 and that the knife edge 48 is directed in the same direction as the knife edge 37.

The bracket 14, upon which the lever 17 is fulcrumed, is provided with a downwardly extending boss 50 into which is adjustably threaded a post 51 having a pivot plate 52 riveted to its lower end and this pivot plate is provided with knife edges 53 and 54. A lock nut 55, threaded on the post 51, serves to retain this post and knife edges in adjusted position.

As is customary, a check link is provided to maintain the condition of level of the receivers 24 and 29. The check link 56 provided for this purpose pivotally engages the knife edges on the pivot plates 36, 46 and 52.

A boss 57 projects inwardly from the rear wall of the shell 11. An upwardly extending suitably bent rod 59 passes through an aperture therein and is locked thereto by means of nuts 58. This rod extends into the hollow interior of a casing 60 erected upon the shell 11 and carries at its upper end a chart 61 having marked thereon a series of indicia 61' extending on both sides of a zero indicium 63. These indicia, as well as the upper portion of an indicator 64, are exposed to view in a fenestration 62. This chart and indicator cooperate to indicate weight values in the well known manner. The indicator 64 is fixed to an upstanding arm of a spider-like plate 65 mounted on a laterally extending shaft 66 whose ends are rotatably mounted in ball bearings 67 which in turn are fixed in the arms of a bifurcated bracket 68 which is mounted on the upwardly extending rod 59. Angularly extending arms 70 and 71 of the spider-like plate 65 engage the inner ends of light spiral springs 72 and 73. The outer ends of these springs are clamped in a holder 74 which, by means of a plate 75 and a screw 76, is clamped to the vertical arm of a sheet metal angle bracket 77 whose other arm, by means of a suitable clamping device 78 and screws 79, is fastened to a shelf-like bracket 80 secured, by means of screws 81, to a boss extending from the loading box 27 of the counterpoise platter supporting spider 26.

When the lever 17 is rocked on its fulcrum pivots 16 the counterpoise platter supporting spider 26 partakes of this movement, being pivotally mounted upon the lever 17. The springs 72 and 73 being operatively connected to this counterpoise platter supporting spider and to the indicator 64 thus serve to actuate this indicator as is fully explained in U. S. patent application Serial No. 174,271, now U. S. Letters Patent No. 2,217,243.

The check link assembly 56 is light, rigid and extremely accurate yet may be inexpensively produced. It comprises two longitudinally extending plates 82 and 82'. These are identical in dimensions. The plate 82 is punched from a piece of strip steel which is capable of being hardened and is provided with three openings 83, 84 and 85. The openings 83 and 85 each have walls which converge to form a V and the apices of these V's form bearings for the knife edges 38 and 49 (Fig. III). The centrally located opening 84 has a straight wall which bears against the knife edge 54 which is rigidly secured to the bracket 14 through the stud 51. The plate 82 is further provided with an opening 86 into which a shouldered tenon of a spacer 87 is loosely riveted. In assembling the check link in the scale, the plate 82', which is identical with the plate 82, is assembled to the plate 82 in reverse position so that a shouldered tenon, machined on the opposite end of the spacer 87' which is loosely riveted in the plate 82', enters an aperture 88 in the plate 82 and a similar tenon on the spacer 87, which is riveted to the plate 82, projects through an aperture 88' in the plate 82'. By means of washers 89 and nuts 90, which are threaded on the projecting portions of these tenons, the two plates are locked together. Since the apertures are slightly larger in diameter than the diameter of the tenons and the length of the shoulders are slightly greater than the thickness of the plates when the washers 89 are clamped against the shoulders by the nuts 90 there is a slight "play" between the plate and the tenon.

The ends of the knife edges 37, 38, 48 and 49 are provided with thrust points obtained by trimming the ends of the pivot plate on a taper. To prevent lateral movement of the assembled link on the knives substantially Z-shaped thrust plates 91 and 91' are riveted as at 92 to the plates 82 and 82' respectively.

If, for example, a load is placed on the inner edge of the commodity platter 24, that is the edge adjacent the housing 60, gravity acts to turn the commodity platter supporting spider 21 about its fulcrum on the commodity supporting pivots 18 in the lever 17. This movement is resisted by the "tension" portion of the check link plate 82, which extends between the bearing walls of the openings 84 and 83, engaged by the stationary knife edge 54 and the knife edge 33 secured to the spider 21. The other end of the plate 82, that is the "compression" portion which extends between the bearing walls of the openings 84 and 85, engaged by the knife edges 54 and 49, resists turning of the counterpoise platter supporting spider 26 when a load is placed near the outer edge of the platter 29. The "tension" portion of the associated check link plate 82' i. e., that portion extending between the bearing walls of the openings 83' and 84' prevents tipping of the counterpoise platter 29 when a load is placed on the counterpoise platter 29 on that half adjacent the housing, and the "compression" portion of this plate, namely the portion extending between the bearing surfaces of the openings 85' and 84' engaged by the knife edges 37 and 53, prevents tipping of the platter 24 when the load is placed on that half of the platter remote from the housing 60.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, an even-arm lever, a frame, fulcrum pivots centrally located in said lever for rockingly mounting said lever on said frame, a pair of load receiver carrying members, a pivot in said lever adjacent each end thereof for supporting one of said load receiver carrying members, a plate having oppositely directed knife pivot edges secured to said frame, such pivot edges being in coincidence with a vertical plane passing through pivot edges of said fulcrum pivots in said lever, said plate secured to said frame being bisected by a plane passing vertically through the longitudinal axis of said lever, a plate having oppositely directed knife pivot edges adjustably secured to the bottom of each of said load receiver carrying members, the pivot edges on one of said plates being oppositely directed to the pivot edges on said plate secured to said frame and the pivot edges on the plate secured to the other of said load receiver carrying members being directed in the same direction as the pivot edges on said plate secured to said first mentioned load receiver carrying member, said plates secured to the bottoms of said load receiver carrying members being bisected by such plane axis passing vertically through the longitudinal axis of said lever and a check link comprising two identical plates having openings in the walls thereof which are adapted to engage such pivot edges for maintaining the condition of level of said load receiver carrying members.

2. In a device of the class described, in combination, an even-arm lever having centrally located fulcrum pivots and load supporting pivots in the free ends thereof, load receiver supporting members pivotally mounted on said pivots in the free end of said lever, pivot plates having opposed knife edges adjustably secured to the bottom of said load receiver supporting means and a plate having opposed knife edges fixedly mounted in alignment with a plane passing vertically through said fulcrum pivots of said lever, a check link comprising two identical plates, each of said plates having an opening adjacent each end thereof and a centrally located opening, the openings adjacent the ends of said plates having converging walls forming a V bearing and the centrally located opening having a wall extending transversely of the longitudinal axis of said plate, a pair of tenoned spacing members and each of said plates being provided with suitably spaced openings to receive such tenons of said spacing members when said plates are assembled in reverse relation to each other.

3. In a device of the class described, in combination, an even-arm lever having centrally located fulcrum pivots and load supporting pivots in the free ends thereof, load receiver supporting members pivotally mounted on said pivots in the free end of said lever, pivot plates having opposed knife edges adjustably secured to the bottom of said load receiver supporting means and a plate having opposed knife edges fixedly mounted in alignment with a plane passing vertically through said fulcrum pivots of said lever and a check link comprising two identical plates, each of said plates having an opening adjacent each end thereof and a centrally located opening, the openings adjacent the ends of said plates having converging walls forming a V bearing and the centrally located opening having a wall extending transversely of the longitudinal axis of said plate.

4. In a device of the class described, in combination, an even-arm lever, centrally located pivots for rockingly supporting said lever, pivots in the end of said lever for supporting members carrying load receivers, a pair of oppositely directed aligned knife edges fixed to each of said supporting members and each of said knife edges pointing in the same direction as its corresponding knife edge on the other of said load receiving carrying members when mounted on said even-arm lever, a fixedly positioned member having oppositely directed knife edges and a check link having means for engaging said pivots for operatively connecting said knife edges on said load receiver carrying members and said fixedly positioned member, said check link comprising a pair of identical plates having openings, spaced so that the walls thereof form bearings to engage said knife edges on load receiver carrying members, when said plates are assembled in reversed relation to each other.

5. In a device of the class described, in combination, a check link comprising two identical plates, each of said plates having an opening adjacent each end thereof, such openings having converging walls forming a V, said V's being directed in the same direction and a mediate opening having a wall extending transversely to the longitudinal axis of said plate, a pair of circular openings in each of said plates, a pair of spacers having tenoned ends, such tenons being adapted to be freely secured in such circular openings and such circular openings being so positioned in each of said plates that when said plates are fastened to each other in spaced reversed relation by said spacers the apices of the V's of such opening in each end of said plates and the transversely extending walls of such mediate openings are in coincidence with each other.

GRANT M. RICHARD.